(12) United States Patent
Helman et al.

(10) Patent No.: US 6,326,969 B1
(45) Date of Patent: Dec. 4, 2001

(54) EMULATING SCREEN OVERLAYS BY FLIP-MAPPING MEMORY

(75) Inventors: Jim Helman, San Carlos; Mark A. Vickers, Belmont, both of CA (US)

(73) Assignee: Liberate Technologies, San Carlos, CA (US)

(*) Notice: Subject to any disclaimer, the term of this patent is extended or adjusted under 35 U.S.C. 154(b) by 0 days.

(21) Appl. No.: 09/080,575

(22) Filed: May 18, 1998

Related U.S. Application Data

(63) Continuation of application No. 08/770,238, filed on Dec. 20, 1996, now Pat. No. 5,991,799.

(51) Int. Cl.$^7$ ................................................. G06T 17/00
(52) U.S. Cl. ........................................... 345/435; 345/436
(58) Field of Search .................................... 345/435, 436, 345/113, 114, 434

(56) References Cited

U.S. PATENT DOCUMENTS

| | | |
|---|---|---|
| 4,035,835 | 7/1977 | Poetsch . |
| 5,155,847 | 10/1992 | Kirouac . |
| 5,373,561 | 12/1994 | Haber et al. ............................ 380/49 |
| 5,436,673 | 7/1995 | Bachmann . |
| 5,444,861 | 8/1995 | Adamec et al. . |
| 5,453,779 | 9/1995 | Dan et al. ................................. 348/7 |
| 5,495,610 | 2/1996 | Shing et al. . |
| 5,497,422 | 3/1996 | Tysen et al. ............................ 380/25 |
| 5,541,638 | 7/1996 | Story ........................................ 348/7 |
| 5,680,458 | 10/1997 | Spelman et al. . |
| 5,752,042 | 5/1998 | Cole et al. . |
| 5,754,939 | 5/1998 | Hertz et al. ............................ 455/4.2 |
| 5,761,306 | 6/1998 | Lewis ...................................... 380/21 |

(List continued on next page.)

OTHER PUBLICATIONS

Bussey H E Et Al: "Service Architecture, Prototype Description, And Network Implications Of A Personalized Information Grazing Service" Multiple Facets Of Integration,San Francisco,Jun. 3–7, 1990 Institute Of Electrical And Electronic Engineers, pp. 1046–1053, XP000164339 see whole document.

Wyle M F: "A Wide Area Network Information Filter" Proceedings International Conference Artificial Intelligence On Wall Street, Oct. 9, 1991, pp. 10–15, XP000534152 see the whole document.

(List continued on next page.)

*Primary Examiner*—Cliff N. Vo.
(74) *Attorney, Agent, or Firm*—Michael A. Glenn

(57) ABSTRACT

A method and apparatus for managing background and foreground display images. Graphics memory for images which are rendered in software is referenced by a processor using an MMU (memory mapping unit) having MMU tables. The graphics memory includes a portion for on-screen display, and a portion which can be written into but which is not displayed. When a background image is overlaid by a foreground image, the portion of the background image overlaid is copied to a save-away area, and the MMU tables are altered so that software rendering of the background image automatically occurs in the save-away area. However, the foreground image is written directly into the on-screen display area by rendering hardware. This allows the software-rendered image to be kept up to date, and allows data for the software-rendered image not to be lost during the time the background image is covered up. When the background image is no longer overlaid by the foreground image, the portion of the background image which was overlaid is copied back from the save-away area to the on-screen display area. The MMU tables are altered so that software rendering of the background image thereafter automatically occurs in the on-screen display area This allows the software-rendered image to be quickly displayed on screen in its updated form.

29 Claims, 3 Drawing Sheets

U.S. PATENT DOCUMENTS

| | | |
|---|---|---|
| 5,764,992 | 6/1998 | Kullick et al. . |
| 5,787,172 | 7/1998 | Arnold .................................. 380/21 |
| 5,796,840 | 8/1998 | Davis ..................................... 380/50 |
| 5,808,628 | 9/1998 | Hinson . |
| 5,809,287 | 9/1998 | Stupeck, Jr. et al. . |
| 5,850,232 * | 12/1998 | Engstrom et al. ................... 345/113 |
| 5,859,969 | 1/1999 | Oki et al. . |
| 5,867,166 | 2/1999 | Myhrvold . |
| 5,870,765 | 2/1999 | Bauer et al. ......................... 707/203 |
| 5,874,967 * | 2/1999 | West et al. ........................... 345/114 |
| 5,877,741 * | 3/1999 | Chee et al. ........................... 345/114 |
| 5,926,624 | 7/1999 | Katz et al. . |
| 5,936,606 * | 8/1999 | Lie ....................................... 345/114 |
| 5,977,960 * | 11/1999 | Nally et al. ........................... 345/113 |
| 6,005,574 * | 12/1999 | Herrod ................................. 345/434 |
| 6,009,363 | 12/1999 | Beckert et al. ......................... 701/33 |
| 6,018,768 | 1/2000 | Ullman et al. ....................... 709/218 |
| 6,026,467 | 2/2000 | Petty . |
| 6,028,583 * | 2/2000 | Hamburg ............................. 345/114 |
| 6,047,269 | 4/2000 | Biffar ..................................... 705/39 |
| 6,049,628 | 4/2000 | Chen . |
| 6,049,835 | 4/2000 | Gagnon ............................... 709/245 |
| 6,104,727 | 8/2000 | Moura et al. ........................ 370/468 |

OTHER PUBLICATIONS

Lang K: "NewsWeeder: learning to filter netnews" Machine Learning. Proceedings Of The Twelfth International Conference On Machine Learning, Tahoe City, CA, USA, Jul. 9–12, 1995, San Francisco, CA, USA, Morgan Kaufmann Publishers, USA, pp. 331–339, XP002046557 see the whole document.

Rosenfeld L B, et al: "Automated Filtering Of Internet Postings" Online, vol. 18, No. 3, May 1994, pp. 27–30, XP000616769 see the whole document.

Yan T W, et al: "Sift—Tool For Wide–Area Information Dissemination" Usenix Technical Conference, Jan. 16, 1995, pp. 177–186, XP000617276 see the whole document.

* cited by examiner

| on-screen | line 1 | pixel range A |
| --- | --- | --- |
| on-screen | line 2 | pixel range B |
| on-screen | line 3 | pixel range C |
| on-screen | line 4 | pixel range D |
| on-screen | line 5 | pixel range E |
| on-screen | line 6 | pixel range F |
| on-screen | line 7 | pixel range G |
| on-screen | line N | pixel range N |

EMULATING SCREEN OVERLAYS BY FLIP-MAPPING MEMORY

CROSS-REFERENCE TO RELATED APPLICATIONS

This is a continuation of the application Ser. No. 08/770,238 filed Dec. 20, 1996 now U.S. Pat. No. 5,991,799.

BACKGROUND OF THE INVENTION

1. Field of the Invention

This invention relates to managing display images.

2. Related Art

Asynchronous rendering of background images and foreground images (foreground overlays) is known. Rendering of the images is typically accomplished by writing data representative of the images in an on-screen area of memory such as a frame buffer. A single frame buffer may be used to store the background image and foreground overlays. The background image is rendered before rendering a foreground overlay over a specified portion of the background image (overlay area). The overlay area is not stored or constantly kept up to date after the corresponding foreground overlay has been written into it.

Since the overlay area is not constantly kept up to date, re-rendering the background image with one or all foreground overlays removed requires at least one additional step of updating the overlay map with up-to-date background image information before transferring the updated overlay area to the frame buffer. This slows down the re-rendering of background images when a foreground overlay is removed, since the overlay area needs to be updated before it can be transferred into the frame buffer.

One solution that avoids the additional step of updating the overlay area with up-to-date background image information is to use multiple frame buffers. But this incurs the additional expense of adding memory management features to coordinate which images in the frame buffers to display, besides the expense of the additional frame buffers.

Accordingly, it would be desirable to provide an apparatus and method for managing the rendering of background images and foreground overlays that keep the overlay area of the background image up to date.

SUMMARY OF THE INVENTION

The invention provides an apparatus and method for managing background and foreground display images. Graphics memory for images which are rendered in software is referenced by a processor using an MMU (memory mapping unit) having MMU tables. The graphics memory includes a portion for on-screen display, and a portion which can be written into but which is not displayed.

When a background image is overlaid by a foreground image, the portion of the background image overlaid is copied to a save-away area, and the MMU tables are altered so that software rendering of the background image automatically occurs in the save-away area. However, the foreground image is written directly into the on-screen display area by rendering hardware. This allows the software-rendered image to be kept up to date, and allows data for the software-rendered image not to be lost during the time, the background image is covered up.

When the background image is no longer overlaid by the foreground image, the portion of the background image which was overlaid is copied back from the save-away area to the on-screen display area. The MMU tables are altered so that software rendering of the background image thereafter automatically occurs in the on-screen display area. This allows the software-rendered image to be quickly displayed on screen in its updated form.

The invention can be used in conjunction with other inventions relating to text and graphic element displays, such as inventions described in the following patent applications: Provisional Patent Application to Serial No. 60/046,750 filed May 16, 1997, entitled "IMPROVED TV QUALITY".

These applications are hereby incorporated by reference as if filly set forth herein.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

The present invention emulates an overlay by flip-mapping memory. This includes re-mapping the addresses of a background portion that will be covered by a fore-ground display image to an off-screen area (save-under area). The re-mapped background portion, i.e., the save-under image, although covered by the foreground image, is kept up to date in the save-under area of memory, but not rendered onto the display screen until the foreground image is removed. Maintaining the save-under image up to date in the off-screen area of memory enables the transfer of the save-under image from the off-screen area to the on-screen area with minimal delay, thereby minimizing display rendering delay time when the foreground image is removed.

System Architecture

Figure 1:
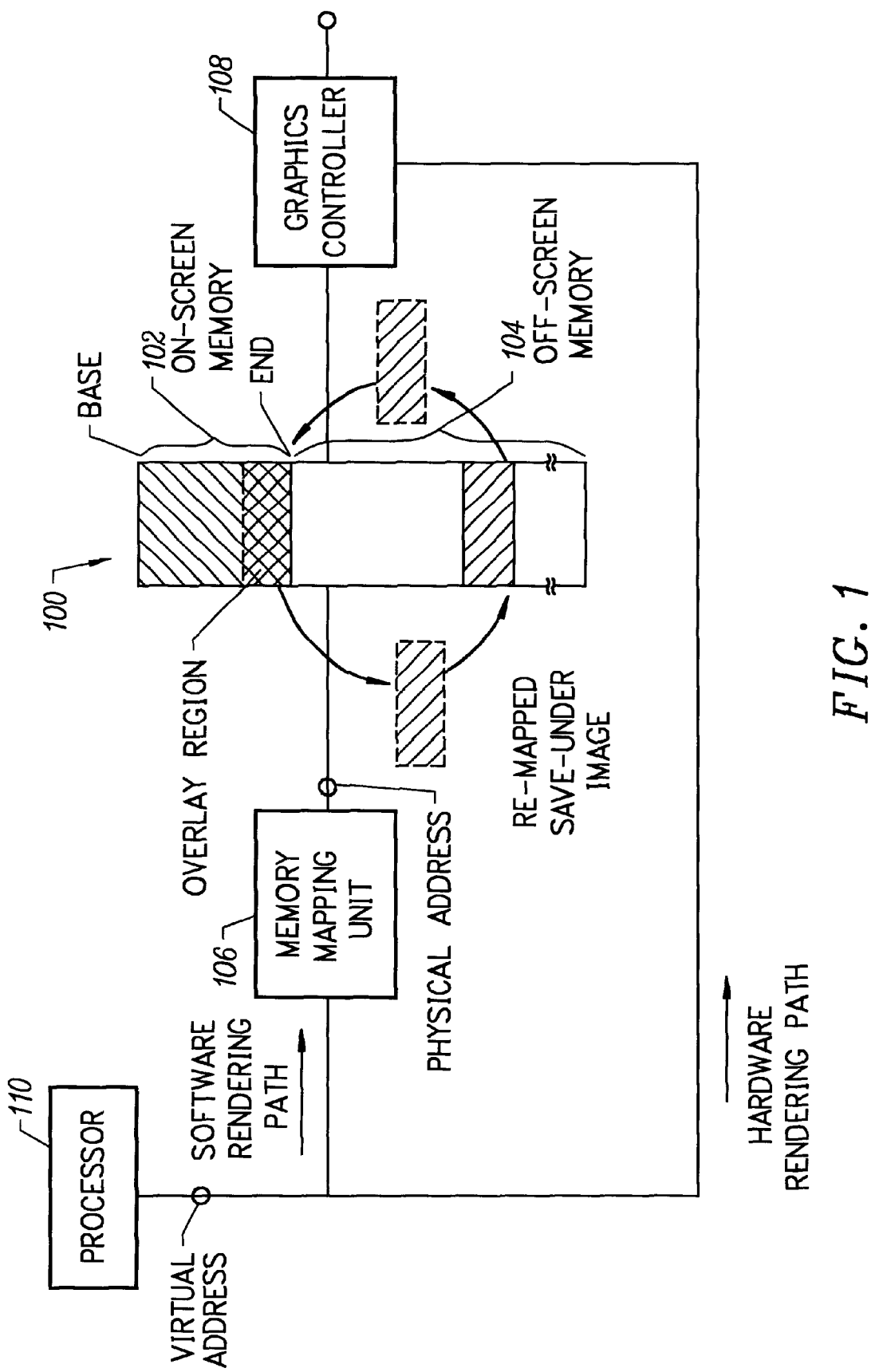
FIG. 1 is a block diagram illustrating a graphics processing architecture.

FIG. 1 is a block diagram illustrating a graphics processing architecture.

FIG. 1 shows a memory 100 comprising at least two memory portions, an on-screen memory portion 102 and an off-screen memory portion (save-under area) 104. The memory is coupled to a memory mapping unit (MMU) 106 having MMU tables and a graphics controller 108, as shown. Using a single memory 100 is not intended to be in any way limiting, but is only one embodiment of the present invention. For example, the save-under area 102 may be separately provided by a frame buffer, while the off-screen memory portion 104 may be provided by a system memory.

In a preferred embodiment, background images are rendered by processor 110 under software control, while foreground images are rendered on-screen directly by graphics controller 108. This enables MMU 106 to route the pixel addresses of background images, which are not intended to be displayed in overlay area of a display screen, to be written directly to on-screen memory portion 104, while background images that are intended to be rendered in an overlay area are re-mapped by MMU 106 to have pixel addresses that are stored in save-under area 102. This enables the re-mapped pixel addresses to be kept up to date, even when covered by a foreground image and, thus, ready for transfer to on-screen memory portion 102 when the foreground image covering the re-mapped pixel addresses is removed.

Alternatively, the re-mapping feature of MMU 106 may be replaced by a processor, such as processor 110, running under software control. Specifically, the software determines when the pixels of a background image are being rendered for the overlaid area and alters the write address of the pixels to refer instead to the off-screen memory portion 104.

In alternative embodiments, processor 110 renders both background and foreground images under software control, using references to different areas of graphics, memory 100. For example, processor 110 under program control re-maps the pixel addresses of background images covered by a foreground image to save-under area 104, while writing foreground images and any background images which are not covered by a foreground image to on-screen memory portion 102. This eliminates the need to have a separate re-mapping element such as MMU 106.

Method of Operation

Figures 2A, 2B:
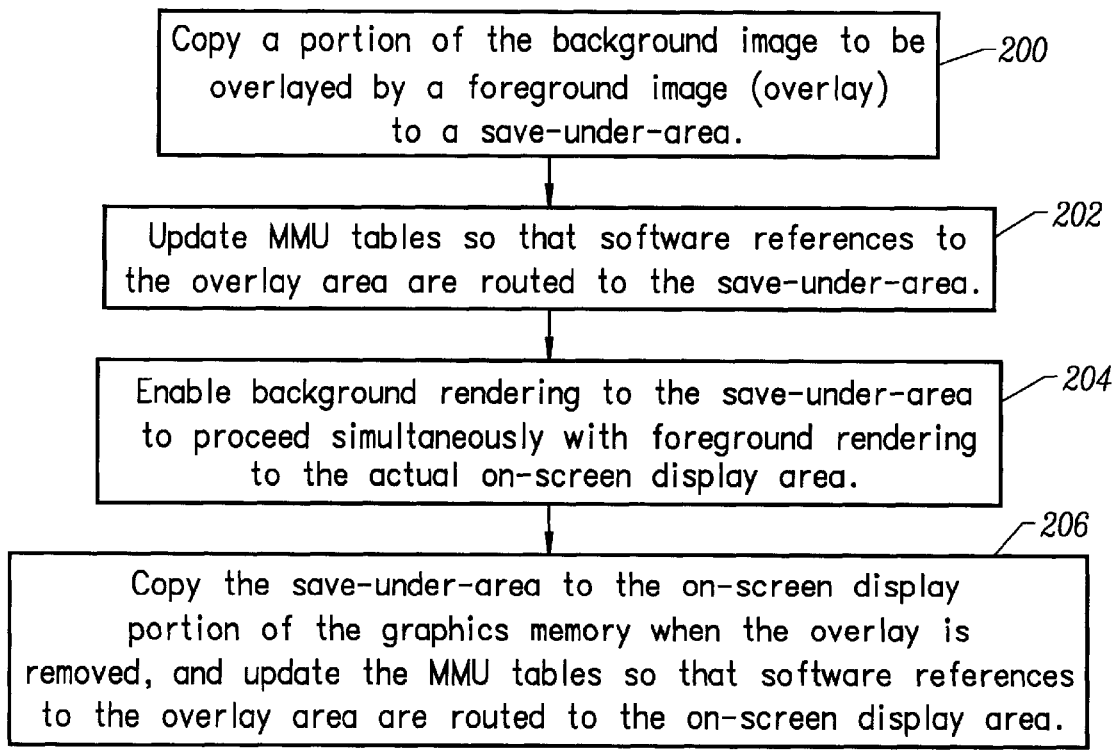
FIG. 2A is a block diagram showing the operation of a preferred embodiments of the present invention.
FIG. 2B is a block diagram showing a flip-mapping table in accordance with an alternative embodiment of the present invention.

FIG. 2A is a block diagram showing the operation of a preferred embodiment of the present invention.

At step 200, the portion of the background image to be overlaid by a fore-ground image (overlay) is copied to a save-under area. The overlay can be another image such as a taskbar.

As discussed above, a save-under image is kept up to date by using a form of memory mapping, but is not stored in an on-screen area of memory until the overlay covering the saved-under image is removed.

At step 202, the MMU tables are updated so that software references such as write addresses to the overlay area are routed to the save-under area. Thus, when the software renders a background image to the overlay area, it is automatically written to the save-under area.

In an alternative embodiment, instead of updating the MMU tables (and in stead of using an MMU), the software rendering the image determines when pixels are being rendered for the overlaid area and alters the write address of the pixels to refer instead to the save-under area.

In another alternative embodiment, the MMU (or a software memory map performing the same function) can be replaced with a table 202a, which indicates on a line-by-line basis 202b, and within each line, on a pixel range basis 202c, which elements are to be replaced by foreground elements, as shown in FIG. 2B.

At step 204, once the MMU tables have been updated, background rendering to the save-under area can proceed simultaneously with foreground rendering to the actual on-screen display area.

In a preferred embodiment, background rendering is performed by the processor under software control, while foreground rendering is performed by the graphics controller hardware. In alternative embodiments, background rendering and foreground rendering can both be performed by the processor under software control, using references to different areas of the graphics memory.

At step 206, when the overlay is removed, the save-under area is copied to the on-screen display portion of the graphics memory, and the MMU tables are updated so that software references to the overlay area are routed to the on-screen display area.

Subtree of Objects

Figure 3:
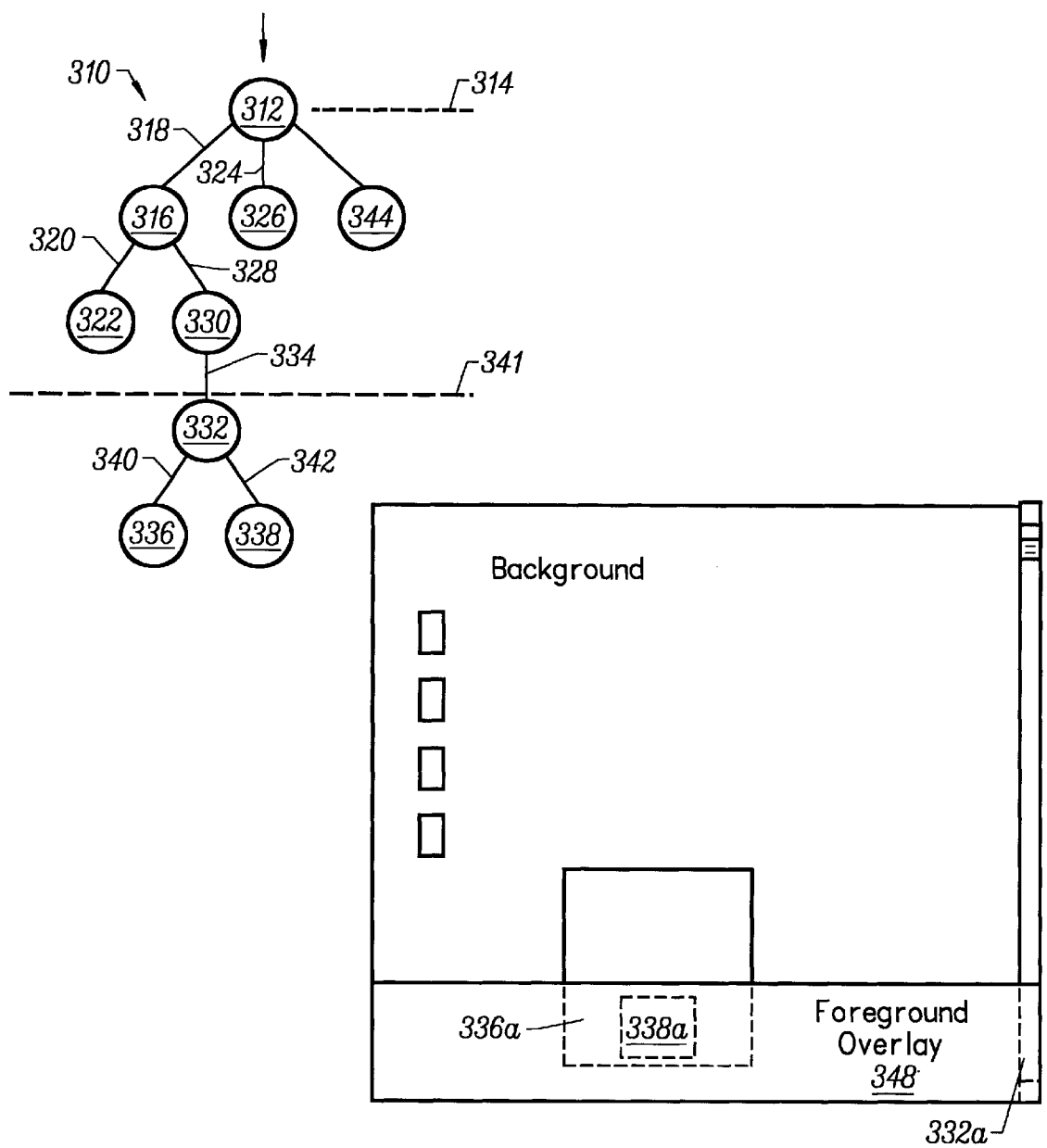
FIG. 3 is a block diagram showing a subtree of objects that correspond to images that are intended for display on a display screen in a preferred embodiment of the present invention.

FIG. 3 is a block diagram showing a subtree of objects that correspond to images that are intended for display on a display screen in a preferred embodiment of the present invention.

An object is defined as having a data structure and a collection of program modules among which is included a process for displaying an image.

Rendering images from a subtree of objects on a display screen may be accomplished in a depth-first manner. Images are rendered from each object on a branch-by-branch basis, starting from a branch that is attached to the highest node. If more than one branch exists per node, rendering starts from the left-most branch and continues downward until objects are exhausted. Rendering then starts at a branch one node above.

For example, at FIG. 3, which shows a subtree of objects 310, object 312 is rendered first, since it is at the highest node ("root node") 314. Object 316 is rendered next, since it is the first object on branch 318, which is the left-most branch connected to root node 312. Since objects are rendered in a depth-first manner, as compared to a breadth-first manner, the rendering path proceeds along branch 320, which is connected to object 322, while under the breadth-first rendering method, the rendering path travels along branch 324, which is connected to object 326.

Returning to the depth-first rendering method, the rendering path proceeds back up branch 320 to object 316 and down branch 328, to render object 330. The rendering path proceeds further downward past a flip-map boundary 331, since an object 332 is available along branch 334. Objects 336 and 338 are rendered next along branches 340 and 342, respectively. Object 344 is rendered last.

When the rendering path traverses flip-map boundary 341 in a downward direction, the present invention re-maps ("flips") the pixel addresses of each image generated from the objects below flip-map boundary 341. Specifically, objects 310, 336 and 338, which correspond to screen images 310a, 336a and 338a, respectively, that are covered by foreground overlay 348, will have their pixel addresses re-mapped (by a memory map unit or equivalent, such as rendering software) to a save-under area in memory. This enables the images to be kept up to date but not displayed until foreground overlay 348 is removed.

When the rendering path returns back across flip-map boundary 341 in an upward direction, the present invention does not re-map the pixel addresses of each image generated by objects located above flip-map boundary 341. This enables the pixels of images that are from objects above flip-map boundary 341 to be rendered onto an on-screen portion of memory, rendering the images directly to the display screen.

Re-routing pixel addresses only when the rendering path encounters pixel addresses from objects below flip-map boundary 341 minimizes the amount of flipping and re-flipping that the present invention must perform. This approach can greatly minimize the amount of processing resources committed to keeping covered images up to date but not displayed, especially in systems that employ software to provide the mapping services of an MMU.

Alternative Embodiments

While preferred embodiments are disclosed herein, many variations are possible which remain within the concept and scope of the invention, and these variations would become clear to one of ordinary skill in the art after perusal of the specification, drawings and claims herein.

What is claimed is:

1. A method of managing background and foreground images in a graphics display system, the method comprising the steps of:

copying image data corresponding to at least a portion of a background image which is intended to be covered by at least a portion of a foreground image from an on-screen memory portion to a save-under area;

covering said at least a portion of said background image with at least a portion of said foreground image;

routing modified image data to said save-under area when said modified image data corresponds to said portion of said background image covered by said portion of said foreground image; and routing said modified image data to said on-screen memory portion when said modified image data corresponds to a portion of said background image not covered by any portion of said foreground image.

2. The method in claim 1, further comprising the steps of removing said portion of said foreground image covering said portion of said background image by copying image data corresponding to said background image in said save-under area to said on-screen memory portion.

3. The method in claim 1, wherein said steps of routing include using an MMU having an MMU table to route said modified image data.

4. The method in claim 1, wherein said step of copying and said step of covering said at least a portion of said background image with said at least a portion of said foreground occur substantially simultaneously.

5. The method in claim 1, further including the step of rendering said background image and said foreground image on a display screen.

6. The method of claim 5, wherein said background image is rendered by a computer system operating under program control and said foreground image is rendered by a graphics display system under hardware control.

7. The method in claim 5, wherein said step of rendering said background image and said foreground image is performed by a computer system operating under program control, said computer system using software references to perform said steps of routing said modified image data to said save-under area and to said on-screen memory portion.

8. A method of managing background and foreground images in a graphics display system, the graphics display system having a memory that includes an on-screen memory portion and an off-screen memory portion, the memory storing the background and foreground images and the graphics display system using the on-screen memory portion as a source of images for display, comprising the steps of:

copying a portion of a background image to be overlaid by a foreground image from the on-screen memory portion to a save-under area within the off-screen memory portion;

routing software references using an MMU which correspond to said portion of the background image to be overlaid to said save-under area, said step of routing enabling said portion of the background image to be overlaid in said save-under area to be written to when said background image is rendered;

rendering the background image to the on-screen memory portion and to the save-under area in response to said software references; and rendering the foreground image to the on-screen memory portion.

9. The method in claim 8, further comprising the steps of:

removing the foreground image by copying contents of said save-under area to the on-screen memory portion; and routing said software references to the on-screen memory portion.

10. The method in claim 8, wherein said step of routing includes updating an MMU table.

11. The method in claim 8, wherein said step of rendering the background image and said step of rendering the foreground image occur substantially simultaneously.

12. The method in claim 8, wherein said step of routing includes determining when said portion of the background image to be overlaid is being rendered and altering the software references to refer to the save-under area instead of the on-screen memory portion.

13. The method in claim 8, wherein said step of rendering the background image is performed by a computer system operating under program control and wherein said step of rendering the foreground image is performed by the graphics display system using hardware control.

14. The method in claim 8, wherein said step of rendering the background image and said step of rendering the foreground image are performed by a computer system operating under program control, said computer system using software references to perform said steps of rendering.

15. An apparatus having a program recorded in a computer-readable medium for laying out a page, the apparatus comprising:

means for copying a portion of a background image to be overlaid by a foreground image for the on-screen memory portion to a save-under area within the off-screen memory portion;

means for routing software references using an MMU which correspond to said overlaid portion of the on-screen memory to said save-under area, said step of routing enabling said overlaid portion in said save-under area to be written to when said background image is rendered;

means for rendering the background image to the on-screen memory portion and to the save-under area in response to said software references in said step of routing; and means for rendering the foreground image defined within said on-screen memory portion onto said overlaid portion.

16. A computer system for managing background and foreground images in a graphics display system, the system comprising:

an on-screen memory portion;

a save-under area; and an image data router responsive to software references corresponding to image data, said image data router sending said image data to said save-under area when said image data corresponds to at least a portion of a background image that is overlaid by at least a portion of a foreground image.

17. The computer system in claim 16, further comprising a graphics adapter for rendering foreground images.

18. The computer system in claim 17, further comprising a processor running under software control, said processor rendering images onto a display screen in response to image data saved in said on-screen memory portion.

19. The computer system in claim 16, wherein said image data router is an MMU having an MMJ table for holding software references.

20. The computer system in claim 19, further comprising a graphics adapter for rendering foreground images.

21. The computer system in claim 20, further comprising a processor running under software control, said processor for sending said image data to said MMU and to said graphics adapter, said graphics adapter responsive to said image data corresponding to said at least a portion of said foreground image.

22. The computer system in claim 16, further comprising a processor running under software control, said processor for establishing said software references in response to whether or not said at least a portion of said background image is covered by said at least a portion of said foreground image.

23. A method as in claim 1, wherein said routing steps are performed by an MMU so as to allow an application program to generate said modified image data for said background image without regard to what portion of said background image is intended to be covered.

24. A method as in claim 1, wherein said background image is generated under control by an application program, and said foreground image is rendered by a graphics controller independent of control by said application program.

25. A method as in claim 8, wherein said routing is performed by said MMU so as to allow an application program to generate said background image without regard to what portion of said background image is intended to be overlaid.

26. A method as in claim 8, wherein said background image is generated under control by an application program, and said foreground image is rendered by a graphics controller independent of control by said application program.

27. An apparatus as in claim 16, wherein said image data router is an MMU that sends said image data to said save under area so as to allow an application program to generate said image data for said background image without regard to what portion of said background image is overlaid.

28. An apparatus as in claim 16, wherein said background image is generated under control by an application program, and said foreground image is rendered by a graphics controller independent of control by said application program.

29. An apparatus having a program recorded in a computer-readable medium for laying out a page, the apparatus comprising:

means for copying a portion of a background image to be overlaid by a foreground image from the on-screen memory portion to a save-under area within the off-screen memory portion;

means for routing software references using an MMU which correspond to said portion of the background image to be overlaid to said save-under area, said means for routing enabling said portion of the background image to be overlaid in said save-under area to be written to when said background image is rendered;

means for rendering the background image to the on-screen memory portion and to the save-under area in response to said software references; and means for rendering the foreground image to the on-screen memory portion.

\* \* \* \* \*